(12) United States Patent
Allanic

(10) Patent No.: US 10,061,869 B2
(45) Date of Patent: Aug. 28, 2018

(54) RAPID PROTOTYPING PROCESS AND DEVICE USING PARALLEL COMPUTATION FOR WORKING POINTS

(75) Inventor: Andre-Luc Allanic, Vierville-sur-Mer (FR)

(73) Assignee: PRODWAYS (FR)

( * ) Notice: Subject to any disclaimer, the term of this patent is extended or adjusted under 35 U.S.C. 154(b) by 471 days.

(21) Appl. No.: 13/878,700

(22) PCT Filed: Oct. 14, 2011

(86) PCT No.: PCT/FR2011/052407
§ 371 (c)(1),
(2), (4) Date: Apr. 10, 2013

(87) PCT Pub. No.: WO2012/049434
PCT Pub. Date: Apr. 19, 2012

(65) Prior Publication Data
US 2013/0190911 A1    Jul. 25, 2013

(30) Foreign Application Priority Data
Oct. 15, 2010 (FR) ...................................... 10 58412

(51) Int. Cl.
*G06F 17/50* (2006.01)
*B29C 64/386* (2017.01)
(Continued)

(52) U.S. Cl.
CPC ............ *G06F 17/50* (2013.01); *B29C 64/386* (2017.08); *B33Y 40/00* (2014.12); *B33Y 50/02* (2014.12);
(Continued)

(58) Field of Classification Search
None
See application file for complete search history.

(56) References Cited

U.S. PATENT DOCUMENTS 5,943,235 A * 8/1999 Earl ........................ B29C 41/36
345/420
6,112,109 A * 8/2000 D'Urso ................. A61F 2/2875
128/898
(Continued)

OTHER PUBLICATIONS

Erdim H. et al, "Classifying Points for Sweeping Solids", Computer-Aided Design Journal, vol. 40, 2008, pp. 987-998, University of Connecticut, Storrs, CT, US.

*Primary Examiner* — Mohammad Ali
*Assistant Examiner* — Saad M Kabir
(74) *Attorney, Agent, or Firm* — Lerner, David, Littenberg, Krumholz & Mentlik, LLP

(57) ABSTRACT

A method for producing a product including steps for determining whether each working point is inside or outside an object corresponding to the product or part to be produced: determining at least one line from between a line passing through the working point with which is associated a counter dedicated to the working point and a line passing through an image of the working point associated with a counter dedicated solely to the working point image; on each of the surfaces, (i) searching for an intersection between the surface and one of the lines from the line passing through the working point and the line passing through the image of the working point and (ii) modifying the counter if the intersection exists, steps (i) and (ii) being performed in a repeated manner; and determining whether the working point is inside or outside the object as a function of the counter.

16 Claims, 6 Drawing Sheets

Cross-section view for determining whether working points D₁ are inside the object O

(51) Int. Cl.
*B33Y 50/02* (2015.01)
*B33Y 40/00* (2015.01)

(52) U.S. Cl.
CPC ......... *G06F 2217/12* (2013.01); *Y02P 90/265* (2015.11)

(56) References Cited

U.S. PATENT DOCUMENTS

2002/0188369 A1   12/2002  Guertin
2005/0015173 A1*  1/2005  Ohmori .................. G06F 19/00
                                                                     700/119

\* cited by examiner

Superposition of several overlapping polimerized layers

Different points and images of points

Cross-section view for determining whether working points $D_i$ are inside the object O

RAPID PROTOTYPING PROCESS AND DEVICE USING PARALLEL COMPUTATION FOR WORKING POINTS

TECHNICAL FIELD

The present invention relates to a process for producing a product, such as a prototype. It also relates to a device for implementing the process according to the invention, and a product obtained by the process or device according to the invention.

The invention enables in particular several successive lithographies of superimposed layers to be made in order to produce a product in three dimensions. The field of the invention is thus more particularly but in a non-limiting way that of rapid prototyping and stereolithography.

BACKGROUND

Processes for producing products (typically prototypes) in three dimensions by stacking layers are known, such as for example by stereolithography or filament deposition (or FDM for "Fused deposition Modeling").

The stererolithography principle is the following:
1) at least one projection image is projected onto a photo-reactive layer, said photoreactive layer solidifying on the area where the projection image is projected, and then
2) the solidified layer is covered with a new photoreactive resin layer, and then
3) once again, at least one projection image is projected onto this new photoreactive layer, steps 2) and 3) being reiterated as many times as required to make a product in three dimensions. Generally, the projection image varies for each layer. For example, to make a ball, this image consists of a disk the diameter of which increases from a first apex of the ball to the middle of the ball, and then decreases from the middle of the ball up to a second apex of the ball.

This technique enables products to be made in three dimensions directly in a photopolymerisable resin without machining. The image being solidified or to be solidified of a layer is also called setpoint image.

The projection image can be much smaller than the area to be solidified. For a same layer, several projections are thus required. For example, for a setpoint image consisting of a square having a 30 centimeter side, a projection image consisting of a square having a 10 centimeter side is successively and side by side projected nine times.

The rapid prototyping by filament deposition consists in melting a resin (generally plastics) through a nozzle heated at high temperature, so as to exit therefrom a resin melted filament (in the order of a tenth of a millimeter) and depositing this wire for melt-bonding it on a previously deposited layer.

In processes for producing products in three spatial dimensions (3D) by stacking layers (as opposed to machining tools which operate by stock removal), there is a step of transforming three spatial dimension (3D) information to a series of two spatial dimension (2D) cross-section information representative of the layers. The layers can be planar such as in stereolithography or curved as in some cases of filament depositions. The conventional technique for transforming the 3D file into a 2D file consists in computing a stack of mathematical cross-sections, corresponding to the actual stack of layers during production.

Once geometric information representative of a cross-section of the product to be produced are available, a further processing of this 2D cross-section information is caused to be performed and thus for each layer, production 2D information suitable for the technology used are obtained.

For example, a path can be defined as vectors (contour vectors, filling vectors) as for example in the case of a prototyping machine with laser and galvanometric mirrors (stereolithography, laser sintering). For a production by filament deposition, the approach is similar but the optimum path is different because the dynamics of the physical head depositing the material is much different from that of a light impact deflected by mirrors.

In other examples, matrix definitions rather than vector definitions can be used, as for example in the case of prototyping machines with direct light projection (or DLP for "Digital Light Processing®") or with printing heads with nozzles. Processing a layer then consists in defining which pixels of the layer are located in the material of the product to be produced. For this, the following algorithm ("scanline fill") is applied in reference to FIG. 1.

For each of the cross-sections to be processed:
a grid 1 is applied onto the layer 2,
for each row 3 of the grid (the columns could also be iterated . . . ):
starting from an end of the row, and going towards to the other edge of the cross-section (from left to right in FIG. 1), by updating a "number of entrances/exits in the material" counter having "0" as an initial value (it is considered that there is no material at the edge of the grid): each time a limit 4 for entrance into the material is crossed, the counter is increased by 1, and it is decremented by 1 each time a limit 5 for exit from the material is crossed;
each time a pixel is crossed, the status of the counter is looked at: if it is higher than 0, the pixel is ticked as being inside the object defined by contours 4, 5, and the pixel is ticked as being outside the object defined by contours 4, 5 otherwise.

The grid 1 of the figure can more generally be any paving for example of the honeycomb type. The iterations then are not made on "rows" or "columns", but along preferential axes of the pavings used.

Such a processing has some drawbacks.

First, it requires a significant computing time.

In order not to immobilize the producing machine during this processing, and because of the complexity of this processing, this processing should be performed on a dedicated calculator independent from the production machine, which implies practically a further step of transferring information from the calculator to another control computer of the production machine.

Further, due to this transfer step, production information should be restricted in volume in order to prevent the transfer from taking too much time, which restricts the spatial resolution in the product to be produced.

Finally, the natural parallelisation of this processing is simple to implement: the processing for each cross-section can be made independently and in parallel. These processings are very likely to take a different time from one layer to the other, for example as a function of the number of entrance and exit limits of the layer. Thus, in the general case, processings will not be of the same duration from one layer to the other and they will have to use iterative mechanisms internal to each layer processing, and with complex synchronization between layer processings.

In a similar way, within one of these processings, the path of lines from one end to the other of the field can be performed in parallel (step 2 above). This is a comparable situation to the paralleling of the sections processings: there are lines that will be more complex than others, as a function of the number of crossings the entrance or exit lines, and with iterative algorithms and complex synchronizations.

It is thus possible to contemplate applying a complex but non-"massive" parallelism, that is only of the "MIMD" ("Multiple Instruction on Multiple Data") type and non of the "SIMD" ("Single Instruction on Multiple Data") type, whereas it is considered that the SIMD algorithms are potentially more efficient, but are restricted in their applicability to particularly simple operations. It is reminded that the SIMD parallelism is one of the four operating modes defined by Flynn taxonomy and designates an operating mode where several computing units operate in parallel, such that the same instruction is applied in parallel over time to several data to produce several results.

The purpose of the present invention is to provide a lithography process or device enabling at least one of the abovementioned drawbacks to be solved.

SUMMARY

This purpose is achieved with a process for producing a product, comprising determining (typically from descriptive data of the object) whether points of a finite space are inside or outside an object decomposed into elementary surfaces, said object typically corresponding to the product to be produced or to a part or layer or slice of the product to be produced,
characterised in that for each working point for which it is attempted to determine whether it is inside or outside the object, the process comprises:
  determining at least one line among a line passing through this working point with which is associated a counter dedicated solely to this working point, and a line passing through an image (translation, rotation, combination of both, etc. . . . ) of the working point with which image is associated a counter dedicated solely to this image of the working point, and
  iterating, on each of the elementary surfaces, the following operations:
    searching for an intersection between the elementary surface and one of the lines from the line passing through the working point and the line passing through the image of the working point,
    modifying the counter if the intersection exists, and
  determining whether the working point is inside or outside the object as a function of the counter dedicated solely to the working point.
Each line can be a straight line or a curved line.
In a first alternative, the process according to the invention is characterised in that:
  determining at least one line comprises determining a line passing through the working point with which is associated a counter dedicated solely to this working point, and/or
  iterating comprises iterating, on each of the elementary surfaces, the following operations:
    searching for an intersection between the elementary surface and the line passing through the working point,
    modifying the counter if the intersection exists, and
  determining whether the working point is inside or outside the object comprises determining whether the working point is inside or outside the object as a function of the value of the counter dedicated solely to the working point.

In this first alternative, the line can pass through an origin, and modifying the counter can comprise:
  if the intersection is located beyond the working point with respect to the origin of the line, no modification of the counter, and
  if the intersection is not located beyond the working point with respect to the origin of the line, modifying the counter differently depending on whether the intersection of the line corresponds to an entrance of the line into the object or an exit of the line from the object with respect to the origin.
In a second alternative, the process according to the invention is characterised in that:
  determining at least one line comprises determining a line passing through the working point with which is associated a counter dedicated solely to this working point and a line passing through an image of the working point with which is associated a counter dedicated solely to this image of the working point, and/or
  the process further comprises separating the elementary surfaces into two distinct groups, a group of surfaces for entrance into the object and a group of surfaces for exit from the object with respect to a direction of movement, and/or
  the iteration comprises an iteration, on each of the elementary surfaces, of the following operations:
    if the surface is an entrance surface, searching for an intersection between this elementary surface and the line passing through the working point and modifying the counter associated with the working point if the intersection exists,
    if the surface is an exit surface, searching for an intersection between this elementary surface and the line passing through image of the working point, and modifying a counter associated with the image of the working point if the intersection exists, and/or
  determining whether the working point is inside or outside the object comprises determining whether the working point is inside or outside the object as a function of the counter dedicated to the working point and the counter dedicated to the image of the working point.
In this second alternative, determining whether the working point is inside or outside the object as a function of the counter dedicated to the working point and the counter dedicated to the image of the working point may comprise comparing the counter dedicated to the working point and the counter dedicated to the image of the working point.

In this second alternative, for all the working points and images of the working points, the lines passing through these points are preferably parallel.

In both alternatives, for all the working points and images of the working points, the lines passing through these points can be parallel or not parallel.

Preferably, for all the working points and images of the working points, the lines passing through these points do not intersect inside the finite space.

The space can be a three dimension space or a two dimension space. If the space is a three dimension space, the working points can be gathered in a working surface, and each line passing through a working point and each line passing through an image of a working point is preferably transverse to this working surface through this working point. The working surface can correspond to a layer or at least a part of a layer to be deposited to produce the product by rapid prototyping.

The iteration step can be performed in parallel over time for several elementary surfaces.

For at least one elementary surface, the iteration step can be performed in parallel over time for several working points.

The iteration steps performed in parallel are preferably synchronized by a fixed run time, and not by waiting for a task end.

Preferably, each line passing through a working point is different from other lines passing through the other working points.

Typically, at least one of the steps of the process according to the invention previously described, preferably each of the steps of the process according to the invention previously described is not performed in a purely abstract or purely intellectual manner but involves use of a technical means.

Typically, each of the steps of the process according to the invention previously described can be implemented by at least one computer, one central processing or computing unit, one analogue electronic circuit (preferably dedicated), one digital electronic circuit (preferably dedicated) and/or one microprocessor (preferably dedicated) and/or by software means.

Once which space point is located inside or outside the object has been determined, the process according to the invention can comprise producing the product by rapid prototyping and/or by layer stacking, for example by stereolithography or by filament deposition.

According to yet another aspect of the invention, it is provided a device for producing a product, implementing a process according to the invention, comprising means for determining (typically from descriptive data of the object) whether points of a finite space are inside or outside an object decomposed into elementary surfaces, said object typically corresponding to the product to be produced or to a part or layer or slice of the product to be produced, characterised in that for each working point for which it is attempted to determine whether it is inside or outside the object, the device comprises:
  means for determining at least one line among a line passing through this working point with which is associated a counter dedicated solely to this working point, and a line passing through an image of the working point with which is associated a counter dedicated solely to this image of the working point, and
  means for iterating, on each of the elementary surfaces, the following operations:
    searching for an intersection between the elementary surface and a single one of the lines from the line passing through the working point and the line passing through the image of the working point,
    modifying the counter if the intersection exists, and
  means for determining whether the working point is inside or outside the object as a function of the counter dedicated solely to the working point.

Each line can be a straight line or a curved line.

In a first alternative, the device according to the invention is characterised in that:
  the means for determining at least one line comprise means for determining a line passing through the working point with which is associated a counter dedicated solely to this working point, and/or
  the means for iterating comprise means for iterating, on each of the elementary surfaces, the following operations:
    searching for an intersection between the elementary surface and the line passing through the working point,
    modifying the counter if the intersection exists, and/or
  the means for determining whether the working point is inside or outside the object comprise means for determining whether the working point is inside or outside the object as a function of the value of the counter dedicated solely to the working point.

In this first alternative, the line can pass through an origin, and the means for iterating can be arranged to modify the counter the following way:
  if the intersection is located beyond the working point with respect to the origin of the line, there is no modification of the counter, and
  if the intersection is not located beyond the working point with respect to the origin of the line, there is a modification of the counter differently depending on whether the intersection of the line corresponds to an entrance of the line into the object or an exit of the line from the object with respect to the origin.

In a second alternative, the device according to the invention is characterised in that:
  the means for determining at least one line comprise means for determining a line passing through the working point with which is associated a counter dedicated solely to this working point and for determining a line passing through the image of the working point with which is associated a counter dedicated solely to this image of the working point, and/or
  the device further comprises means for separating the elementary surfaces into two distinct groups, a group of surfaces for entrance into the object and a group of surfaces for exit from the object with respect to a direction of movement, and/or
  the means for iterating comprise means for iterating, on each of the elementary surfaces, the following operations:
    if the surface is an entrance surface, searching for an intersection between this elementary surface and the line passing through the working point and modifying the counter associated with the working point if the intersection exists,
    if the surface is an exit surface, searching for an intersection between this elementary surface and the line passing through the image of the working point, and modifying a counter associated with the image of working point if the intersection exists, and/or
  the means for determining whether the working point is inside or outside the object comprises means for determining whether the working point is inside or outside the object as a function of the counter dedicated to the working point and the counter dedicated to the image of the working point.

In this second alternative, the means for determining whether the working point is inside or outside the object as a function of the counter dedicated to the working point and the counter dedicated to the image of the working point can comprise means for comparing the counter dedicated to the working point and the counter dedicated to the image of the working point.

In this second alternative, for all the working points and the images of the working points, the lines passing through these points are preferably parallel.

In both alternatives, for all the working points and images of the working points, the lines passing through these points can be parallel or not parallel.

Preferably, for all the working points and the images of the working points, the lines passing through these points do not intersect inside the finite space.

The space can be a three dimension space or a two dimension space. If the space is a three dimension space, the working points can be gathered in a working surface, and each line passing through a working point and each line passing through an image of a working point is preferably transverse to this working surface through this working point. The working surface can correspond to a layer or at least a part of a layer to be deposited to produce the product by rapid prototyping.

The means for iterating can be arranged to perform in parallel over time iterations for several elementary surfaces.

For at least one elementary surface, the means for iterating can be arranged to perform in parallel over time iterations for several working points.

The device according to the invention can further comprise means for synchronizing, by a fixed run time, iterations performed in parallel, and not by waiting for a task end.

Preferably, each line passing through a working point is different from other lines passing through the other working points.

Typically, at least one of the means of the device according to the invention previously described, preferably each of the means of the device according to the invention previously described are technical means.

Typically, each of the means of the device according to the invention previously described can comprise at least one computer, one central processing or computing unit, one analogue electronic circuit (preferably dedicated), one digital electronic circuit (preferably dedicated) and/or one microprocessor (preferably dedicated) and/or software means.

The device according to the invention can further comprise means for producing, once which space point is located inside or outside the object has been determined, the product for example by rapid prototyping and/or layer stacking, for example by stereolithography or filament deposition.

According to yet another aspect of the invention, it is provided a product obtained by a producing process according to the invention or by a producing device according to the invention.

BRIEF DESCRIPTION OF THE DRAWINGS

Further advantages and features of the invention will appear upon reading the detailed description of implementations and embodiments in no way limiting, and the following appended drawings wherein.

DETAILED DESCRIPTION

Figure 2:
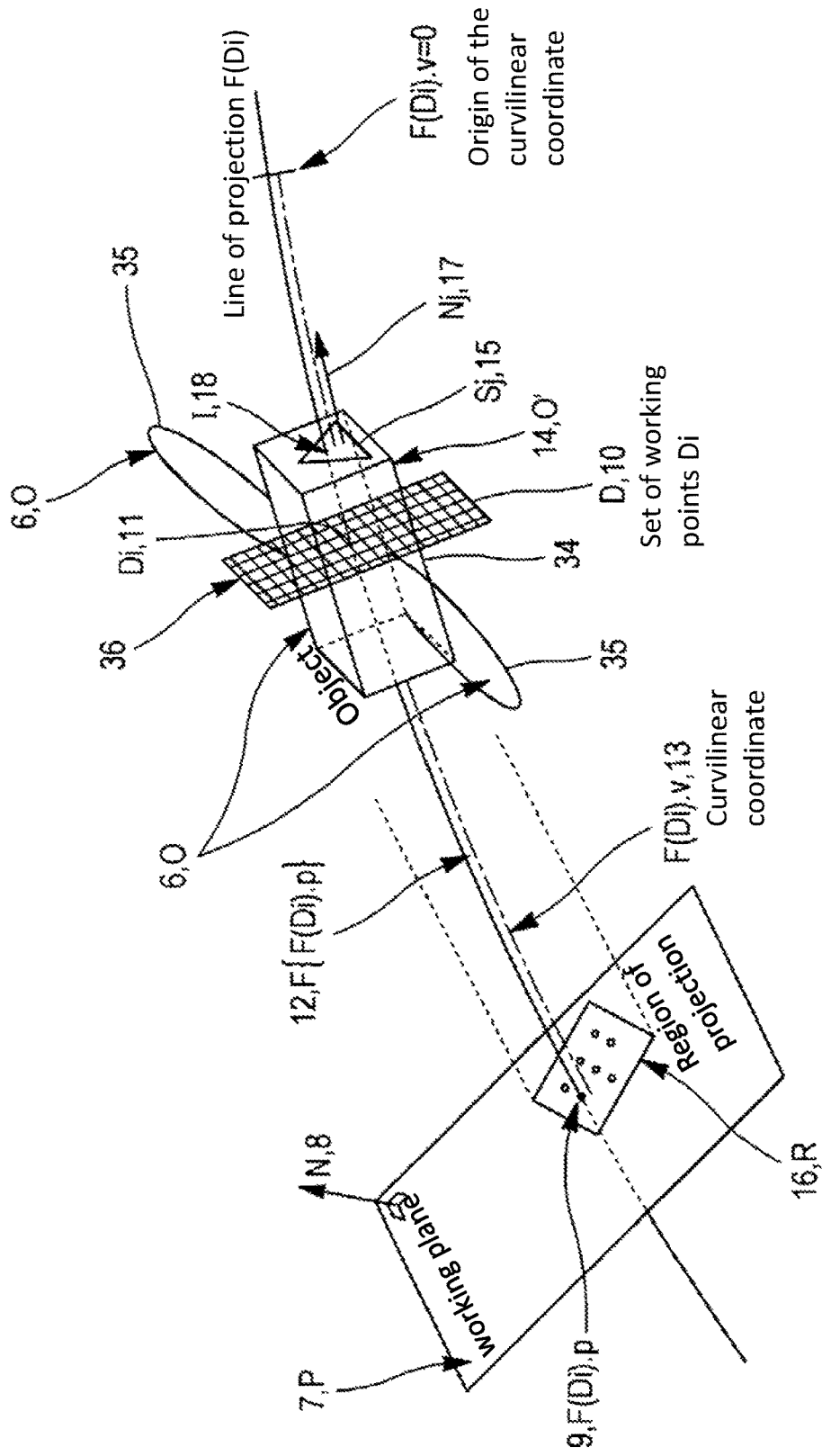
FIG. 2 illustrates different data of a process according to the invention.
Figure 3:
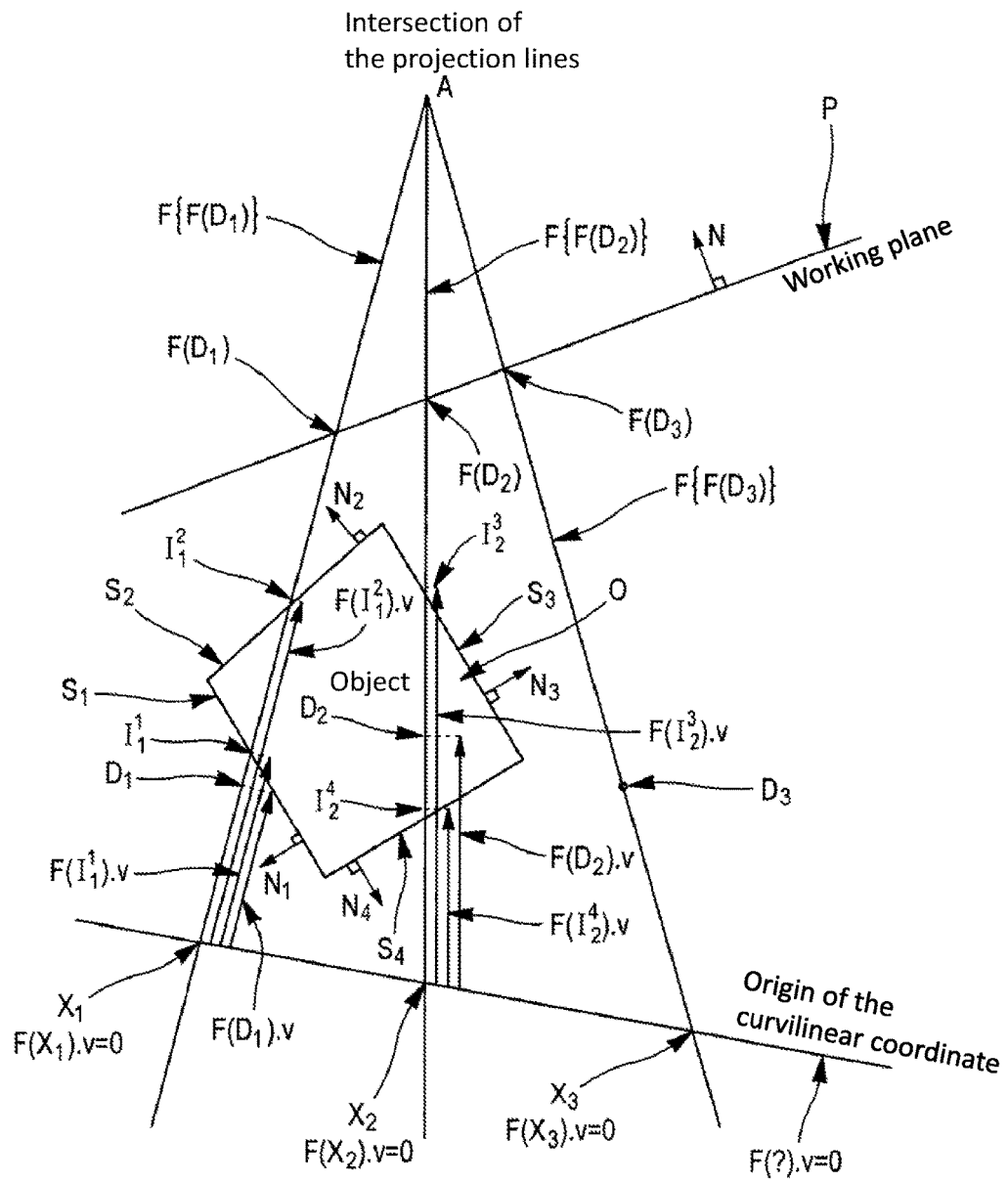
FIG. 3 illustrates a first exemplary implementation of the process according to the invention.
Figure 4:
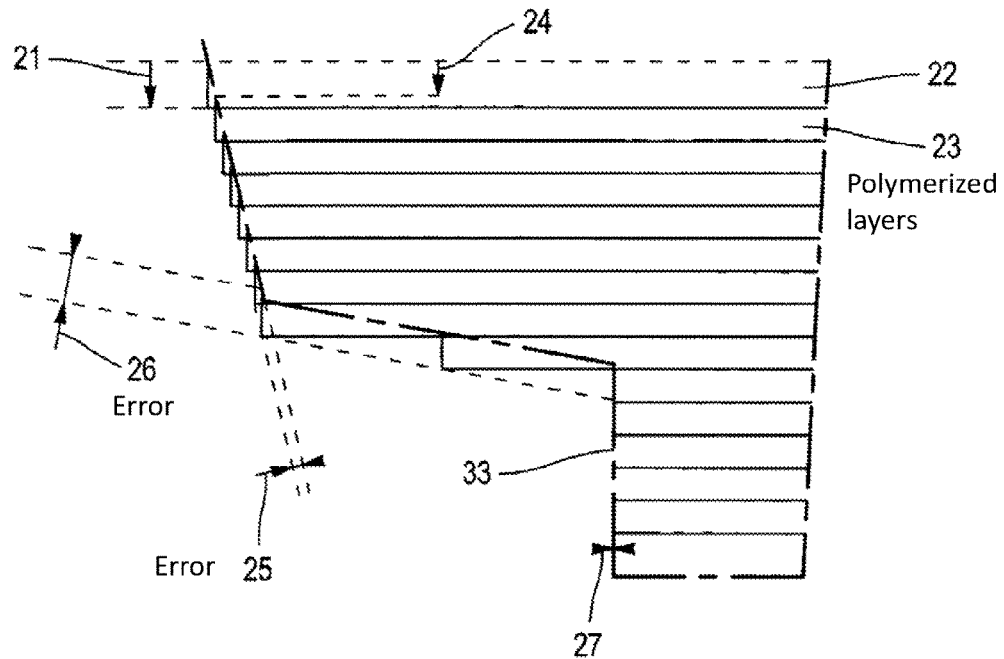
FIG. 4 illustrates a superposition of several overlapping polymerized layers and obtained by the first exemplary implementation of the process according to the invention.
Figure 5:
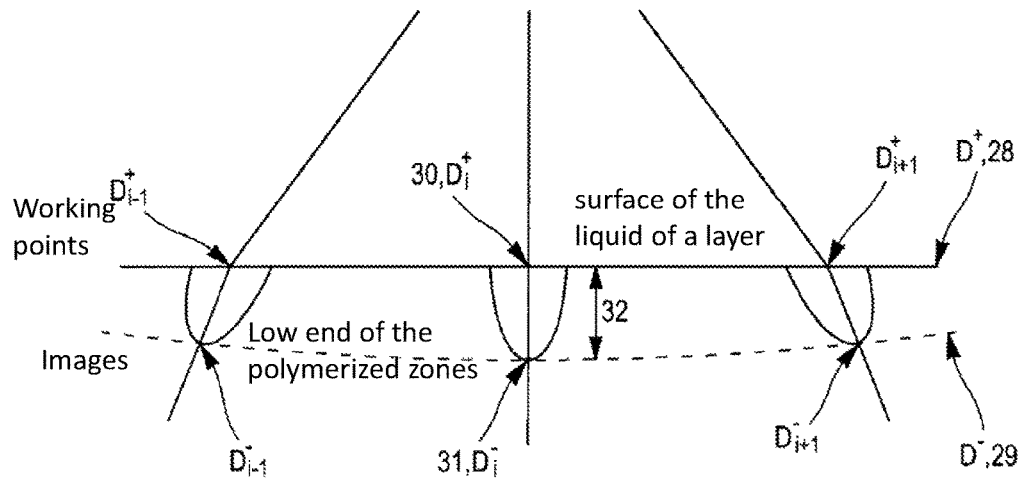
FIG. 5 illustrates different points and images of points in a second exemplary implementation of the process according to the invention.

There will now be described, in reference to FIGS. 2 to 6, different embodiments of the process according to the invention to produce a product by rapid prototyping. For this, it is considered an object O (referenced 6) which is at least a part of the product to be produced. The object O is an object:
  in a three dimension space E (3D object), as illustrated in FIG. 2, and in this case, the 3D object corresponds to the 3D product to be produced, or
  in a two dimension space E, as illustrated in FIGS. 3 and 5: in this case, this 2D object in a two dimension space typically corresponds to a slice of a 3D product to be built; this slice can consist in any, oblique or other slice of the 3D product to be built, preferably the vertical one, but preferably does not consist in one of the horizontal layers to be deposited to produce the product by rapid prototyping. Further, in the case where the object is in two dimensions, each surface $S_i$, $S_j$, P or R described latter is a surface having a null width, that is a line.

By two dimension space, it is typically meant either:
  a nappe or surface or plane decomposable into points or pixels,
  or a layer decomposable into voxels along two spatial directions X and Y and having a thickness of a single voxel along a third spatial direction Z.

By three dimension space, it is typically meant a space decomposable into voxels and having a thickness higher than one voxel along each of the three spatial directions X, Y and Z.

It will be first described, in reference to FIG. 2, different data and information operated in the exemplary process of the invention or required for understanding exemplary processes according to the invention.

Preliminary, a number of hypotheses will be admitted.

There is a description of the object O, typically in the form of at least one data computer file. The object O is assumed to be described in the finite space E. The space E is an Euclidian space.

The description of the object O makes it possible to unambiguously determine whether a point of E is part or not of the object O. This can imply the correction of ambiguities sometimes found in some corrupted files (so-called unclosed files). Numerous softwares enable these files to be manually or automatically corrected. Within the scope of the examples described in the invention, all the ambiguities have been removed.

The description of the object O is in the form of a decomposition of the object O into several oriented and preferably planar elementary surfaces $S_i$:

$$O = \bigcup_i S_i$$

For example, this condition is met if the object O is described in a de facto standard of the rapid prototyping, that is in a form of a collection of oriented triangles. Such a standard is called STL (for "stereolithography"). If the object O is in a format from a CAD software, there are always STL interfaces which respect the original form up to arbitrarily high accuracies.

The process according to the invention is performed from these descriptive data of the object O, which take the form either of a decomposition of the object O into several oriented, non-null area, and preferably planar elementary surfaces $S_i$ if the object O is described in a three spatial dimension space E, or a decomposition of the object O into several oriented and preferably straight elementary lines $S_i$ (also called elementary surfaces for the sake of brevity of the description) if the object O is described into a two spatial dimension space E.

Throughout this document, each index i or j is a natural integer between 1 and M, with M for example as the case may be a total number of working points $D_i$ or elementary surfaces $S_i$ or $S_j$ respectively.

A working plane P, (referenced 7) is defined oriented by its normal N (referenced 8).

A projection F is defined which has any point X (or $A_E$ or Y or $D_i$ depending on the point considered) of E not belonging to P associates a point $A_P$ belonging to P, or indicates that there is no point of P satisfying the projection, that is that F is not applicable. When F is applicable, $A_P$ is denoted as F(X).p the point of P projection by F of X, or even as $F(D_i)$.p (referenced 9) the point of P projection by F of $D_i$.

F meets the following conditions:
a. The set of points of E having as a projection a same point $A_P$ of P, noted $F\{A_P\}$ (or even $F\{F(X).p\}$, $F\{F(D_i).p\}$, ... depending on the point considered, also noted $F\{F(X)\}$, $F\{F(D_i)\}$, ...), is continuous, derivable, of dimension 1. A curvilinear coordinate can thus be defined on this set, as well as a tangent in any point.
  i. F(X).v denotes the curvilinear coordinate of X along $F\{F(X).p\}$.
  ii. F(X).n denotes the tangent to $F\{F(X).p\}$ at the point X.
b. A point of E can only have a single projection by F (more formally: if X has its projection F(X).p and Y has its projection F(Y).p, and F(X).p is not confounded with F(Y).p, then X is not confounded with Y).
c. The "curvilinear coordinate" along a set $F\{A_P\}$ makes up an order relation on $F\{A_P\}$.

Conditions a and b are met for example for an "orthographic" projection with a direction of projection non-parallel to P and a perspective point to infinity, or a projection that starts from a perspective point $A_I$ which defines $A_P$ as the intersection of the straight line $(A_I A_E)$ with P, if any. In the relevant case, projections can be defined which are no longer based on straight lines, but on modelling of light paths in an optical system (broken lines), for example to take geometrical deformations of the device used into account.

Condition c can be met with quite simply the curvilinear coordinate equal to the linear distance along $F\{A_P\}$ between an origin and the point considered. However, for compatibility reasons of the computations with other restraints (use of homogenous coordinates), the inverse of this linear distance is preferably taken, with an origin which is not found on P, the whole being multiplied by a constant. The algorithm would apply as well on other exemplary monotonous functions. The important thing is to be able to apply an order relation to the elements of $F\{A_P\}$, that to compare values therebetween and make sure that the comparison is transitive. Then, a set $$D = \bigcup_i D_i$$

(referenced 10) is considered of working points $D_i$ (referenced 11) of E for which there is a projection by F, and for which it should be determined whether each of them is part or not of the object O. Ideally, this set comprises numerous points (hundreds of thousands for example), to take best advantage of the targeted SIMD model. The process according to the invention works very well for a few tens to a few tens of millions of elements.

Here is its description (FIG. 2) according to the following steps I to IV:

I. Optionally, a subset O' (referenced 14) of O is determined:

$$O' = \bigcup_j S_j$$

such that the description of the object O' has the form of a decomposition of the object O' into several elementary surfaces $S_j$ (referenced 15) selected from the $S_i$, being oriented and preferably planar. The interest of determining such a subset is illustrated in FIG. 2: for an object O comprising a casing 34 and fins 35, only the object O' only comprising the casing 34 without the fins 35 can be considered to determine whether the points $D_i$ of the set D are in the casing 34 and thus in the object O. the subset O' is determined:
either by keeping O'=O (in this case, the set of $S_j$ corresponds to the set of $S_i$, and it is sufficient to replace $S_j$ by $S_i$ and O' by O in the following of the description),
or optionally by carrying out a filter according to the following steps a. and b.:
  a. a region R (referenced 16) of P containing all the $F(D_i)$.p is determined
  b. the subset O' of O is determined such that an element of O not being part of O' has no projection by F on P belonging to R. This sorting step is conventionally used in computer science to reduce the computing time by locally applying it to a smaller subset (herein only the elements of O which can have a projection in R).

II. For any element $D_i$ belonging to D, that is for each working point $D_i$ for which it is attempted to determine whether it is inside or outside the object O', a line $F\{F(D_i).p\}$ (referenced 12) passing through this working point is determined and $F(D_i)$.v (referenced 13) the curvilinear coordinate of the working point $D_i$ along $F\{F(D_i).p\}$ is determined. If E is a three dimension space, there are cleverly selected as illustrated in FIG. 2:
the set D of the working points $D_i$ for these points $D_i$ to be gathered in a working plane or working surface 36, the plane or the surface 36 preferably corresponding in one of the layers to be deposited to produce the product by rapid prototyping, and
each line $F\{F(D_i).p\}$ so as to be transverse to this plane or surface 36 by the point $D_i$ associated with this line. This enable to maximize the number of iterations (step IV described later) to be parallelized over time, and can enable the operations for all the working points (pixels or voxels) of a same layer of rapid prototyping to be simultaneously iterated over time.

III. At each working point $D_i$, for which it is attempted to determine whether it is inside or outside the object O', and thus at any line $F\{F(D_i).p\}$, is associated a counter dedicated solely to this working point $D_i$, denoted $F(D_i).c$, and the value of which is initialized to 0.

IV. On each of the elementary surfaces $S_j$, the following operations are iterated: for any element $S_j$ belonging to O', its normal is denoted $N_j$ (referenced 17). For any $D_i$ belonging to D, the intersection between $F\{F(D_i).p\}$ and $S_j$ is computed. In other words, an intersection is searched for between the elementary surface $S_j$ and the line $F\{F(D_i).p\}$ passing through the working point $D_i$:

i. if there is no intersection, proceed to next $D_i$ ii. if there is an intersection I (reference 18), and if $F(I).v > F(D_i).v$, that is if the intersection I is located beyond the position of the working point $D_i$ along the line $F\{F(D_i).p\}$ with respect to an origin $F(D_i).v=0$ of the line, proceed to next $D_i$ iii. if $F(I).v \leq F(D_i).v$, that is the intersection I is located before or on the position of the working point $D_i$ along the line $F\{F(D_i).p\}$ with respect to the origin $F(D_i).v=0$ of the line, and:

if the scalar product $\vec{N_j}.\vec{F(I).n}$ is $>0$, that is if the surface $S_j$ is a surface for entrance of the line into the object O', the counter $F(D_i).c$ is modified according to an entrance modification (typically $F(D_i).c$ is incremented by 1 unity), or else (if the scalar product $\vec{N_j}.\vec{F(I).n}$ is $\leq 0$, that is if the surface $S_j$ is a surface for exit of the line from the object O'), the counter $F(D_i).c$ is modified according to an exit modification having the value opposite to the entrance modification (typically $F(D_i).c$ is decremented by 1 unity).

V. the fact that $D_i$ belongs or not to the object O' is deduced from the sign of $F(D_i).c$: $D_i$ belongs to O' if and only if $F(D_i).c > 0$. In other words, it is determined whether the working point is inside or outside the object O' as a function of the positive or negative value (or the sign) of the counter $F(D_i).c$ dedicated solely to the working point $D_i$.

Almost all the computation of the process according to the invention are performed during step IV, which has as essential characteristics:

- the computation can be simple (by carefully selecting F, it can for example be implemented in the form of an intersection between a plane and a straight line)
- the elementary operations used (scalar products, products of matrices) are intrinsically vectorial and thus easy to be parallelized
- the maximum duration of the operation is bounded (no loop) and identical from operation to operation as soon as the operation has a non-trivial result (that is if we do not proceed to next $D_i$)
- data required are few (needing $S_j$ and $D_i$), and totally independent from results of other intermediate operations: $S_j$ and $D_i$ are directly data of the problem to be solved.

This process according to the invention is thus particularly suitable for implementation in the SIMD form:

- program instructions are common to all the parallel tasks
- data do not depend on any intermediate operation
- the synchronization is trivial, by a simple fixed run time.

Further, depending on the choice of the origin position and/or a programming choice, subparagraphs i. to iii. of step IV can vary, for example according to the following alternative:

i. if there is no intersection, proceed to next $D_i$ ii. if there is an intersection I (referenced 18), and if $F(I).v \leq F(D_i).v$, that is if the intersection I is located before the position of the working point $D_i$ along the line $F\{F(D_i).p\}$ with respect to an origin $F(D_i).v=0$ of the line, proceed to next $D_i$ iii. if $F(I).v > F(D_i).v$, that is if the intersection I is located beyond the position of the working point $D_i$ along the line $F\{F(D_i).p\}$ with respect to the origin $F(D_i).v=0$ of the line, and:

if the scalar product $\vec{N_j}.\vec{F(I).n}$ is $>0$, that is if the surface $S_j$ is a surface for entrance of the line into the object O', the counter $F(D_i).c$ is modified according to an entrance modification (typically $F(D_i).c$ is incremented by 1 unity), else (if the scalar product $\vec{N_j}.\vec{F(I).n}$ is $\leq 0$, that is if the surface $S_j$ is a surface for exit of the line from the object O'), the counter $F(D_i).c$ is modified according to an exit modification having the value opposite to the entrance modification (typically $F(D_i).c$ is decremented by 1 unity).

Detailed Example of a First Embodiment of the Invention (FIG. 3)

A first exemplary implementation of the process according to the invention will now be described in reference to FIG. 3. This is a cross-section view, to simplify the description relative to a view similar to that of FIG. 2). In this example, space E is thus of two dimensions.

It is attempted to determine whether all three points of $D=\{D_1, D_2; D_3\}$ belong to O. The object O is a rectangle consisting of the elementary surfaces $S_1$, $S_2$, $S_3$ and $S_4$. In the following, $I_i^j$ will denote the intersection of the line $F\{F(D_i).p\}$ with the surface $S_j$. The process according to the invention then comprises the following steps:

1. Initializing all $F(D_i).c$ to 0.
2. Computing all $F(D_i).v$
3. Processing $S_1$
  a. Processing $D_1$.
    i. Computing $I_1^1$, which exists
    ii. $F(I_1^1).v > F(D_1).v$
    iii. $\vec{N_1}.\vec{F(I_1^1).n}$ is $<0$, thus $F(D_1).c$ is decreased by one unity
  b. Processing D2
    i. Computing $I_2^1$, which does not exist
  c. Processing D3
    i. Computing $I_3^1$, which does not exist
4. Processing $S_2$
  a. Processing $D_1$.
    i. Computing $I_1^2$, which exists
    ii. $F(I_1^2).v > F(D_1).v$
    iii. $\vec{N_2}.\vec{F(I_1^2).n}$ is $>0$, thus $F(D_1).c$ is increased by one unity
  b. Processing D2
    i. Computing $I_2^2$, which does not exist
  c. Processing D3
    i. Computing $I_3^2$, which does not exist
5. Processing $S_3$
  a. Processing $D_1$.
    i. Computing $I_1^3$, which does not exist
  b. Processing D2
    i. Computing $I_2^3$, which exists
    ii. $F(I_2^3).v > F(D_2).v$ iii. $\vec{N_3}.\overrightarrow{F(I_2^3)}.n$ is >0, thus $F(D_2).c$ is increased by one unity
c. Processing D3
i. Computing $I_3^3$, which does not exist
6. Processing $S_4$
a. Processing $D_1$.
i. Computing $I_1^4$, which does not exist
b. Processing $D_2$
i. Computing $I_2^4$, which exists
ii. $F(I_2^4).v<F(D_2).v$
c. Processing D3
i. Computing $I_3^4$, which does not exist
7. Final determination step: at the end of run, there is:
a. $F(D_1).c=0-1+1=0$, thus $D_1$ does not belong to O: point $D_1$ is outside the object O.
b. $F(D_2).c=0+1=1$, thus $D_2$ belongs to O: point $D_2$ is inside the object O.
c. $F(D_3).c=0$, thus $D_3$ does not belong to O: point $D_3$ is outside the object O.

Differences and Advantages of the Invention with Respect to the State of Prior Art To determine whether a point of E belongs or not to the object O or O', it is not mandatory to compute an intermediate structure (layer, voxel stack, etc.) because E can be directly a 3 dimension space.

Thus, if the object O is a 3D object corresponding to the 3D product to be produced, it is possible to determine which point of the space E is inside the object O according to the process according to the invention, and then only after that to cut this object O into layers to be deposited one after the other by stereolithography, or filament deposition, or other. This in particular enables cutting, in particular orientation of cutting to be optimized, depending on the result of the determination of which point is located inside or outside the object O.

Conversely, it is possible to start cutting the 3D product into layers, each layer then making up a 2 dimension object O for which it will be attempted according to a process according to the invention to determine which point is inside the object O.

The results of this computation are not reused either to infer therefrom any thing about other points of E. Certainly, some data are used in several computations, but they make up the initial data of the problem. The intersection computation between $F\{F(D_i).p\}$ and $S_j$ for any couple $(i,j)$ does make an element $j$ intervene several times for all the elements $i$, and conversely. However, these elements intervening several times are not results of the computations but are data, that's why complex synchronizations are not needed to wait for results, nor particular sequencing of the instructions. According to the invention, it is not necessary to store the existence or coordinates of the intersection points, which thus are not stored.

Figure 1:
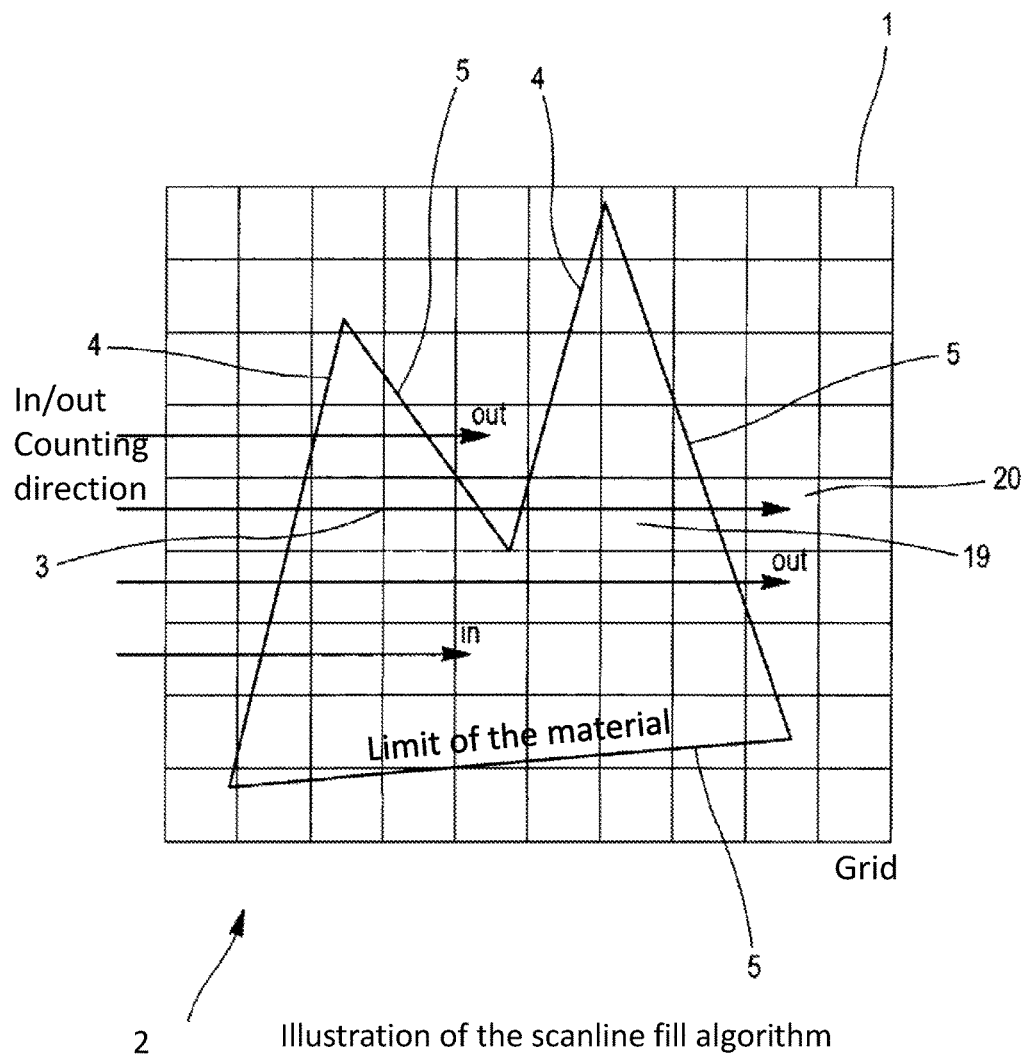
FIG. 1 illustrates a process according to the state of prior art.

It is noted by comparing the invention illustrated in FIG. 3 with respect to the state of prior art of FIG. 1, that according to the invention, the lines $F\{F(D_i).p\}$ can be non parallel. In this case, preferentially, the set of lines $F\{F(D_i).p\}$ associated with the points $D_i$ do not intersect inside the space E. In reference to FIG. 3, point A is thus located outside space E.

A major difference with respect to the state of prior art is that according to the invention, each counter is associated with one and single point or pixel or voxel, whereas according to the state of prior art, each counter is associated with a set of pixels aligned on a line 3. Each counter associated with a point is distinct from the counters associated with the other points. In other words, according to the invention, there are at least as many (as many for the first exemplary embodiment or even the double for the second exemplary embodiment described later) counters as working points, whereas according to the state of prior art, there are much fewer counters than points because a single counter can be associated with several thousand aligned pixels. A major advantage of the process according to the invention is that it can be extremely quick to be implemented. Indeed, according to the invention, computations relating to each intersection of an elementary surface $S_j$ with a line passing through a working point $D_i$ can be performed:

in parallel over time (that is simultaneously or without waiting for the result of another intersection computation) for several or even all the elementary surfaces $S_j$, and/or in parallel over time (that is simultaneously or without waiting for the result of another intersection computation) for several or even all the working points $D_i$.

To simply illustrate this technical advantage:
according to the state of prior art illustrated in FIG. 1, as previously described, starting from an end of the line 3, and going towards to the other edge of the section, updating a counter "number of entrances/exits in the material" having the initial value "0", and each time a pixel is crossed, the status of the counter is checked: if it is higher than 0, the pixel is ticked as being in the material, and conversely otherwise. It will be thus readily understood that it is necessary to make the computations and the determination regarding pixel 19 before the computation and the determination regarding pixel 20: it is impossible to make the computation for each pixel or point independently of the other, and the thousands of computations corresponding to the thousands of pixels aligned on a line 3 should necessarily be made in series one after the other.

Conversely, according to the first exemplary embodiment of the invention previously described in reference to FIG. 3, several or even all the computations for searching for intersections and determining the modification of the counter 3a, 3b, 3c, 4a, 4b, 4c, 5a, 5b, 5c, 6a, 6b and 6c can be performed in parallel over time, and then several or even all the steps of determining 7a, 7b and 7c whether the working point $D_1$, $D_2$ or $D_3$ is inside or outside the object O can be performed in parallel over time.

The invention is thus particularly suitable for an implementation in the SIMD form:
tasks or instructions of the process according to the invention (encoded within a program or a dedicated analogue or digital circuit or a dedicated microprocessor) for searching for intersections and determining the modification of the counter are common to all the couples point $D_i$ and surface $S_j$, and thus can be performed in parallel data for these tasks or instructions do not depend on any intermediate operation synchronizing these tasks (one task representing a single iteration step, that is a single set [IVi and IVii and IViii] in the embodiment just described or a single step VIII.i) or VIII.ii) in the embodiment that will be described later) is trivial, by simple fixed run time because the maximum duration of these tasks is bounded (no loop), and identical from one operation to the other as soon as the operation has a non-trivial result (that is as soon as there is an intersection which implies to modify a counter).

Typically, it will now be described how the synchronization is conducted. A time upper bound is defined, which equals the maximum duration of these tasks, that is which equals an iteration step (labelled IV in the embodiment just described or VIII in the embodiment that will be described later) for which there is an intersection which implies to modify a counter. Then, it will be described how this happens, typically within a processor:

- at first, sufficient information is prepared to perform the (typically millions) of "iteration steps", and then
- these iteration steps are gathered by elementary surface, and then
- these iterations steps are unwound surface by surface, thus creating a great number of small tasks in queue (typically: millions); these tasks are distributed on a number of computation nodes (typically: hundreds) as the queue is emptied, and then
- when all the computation nodes are ready, they are started up altogether. Each node processes an elementary task; and then
- the end of the computation for each node is waited for. The duration of an elementary task is defined fixedly, that is constant whatever this elementary task, and equal to the time upper bound. As each node runs the same task on different data, the duration of a node is defined fixedly, that is constant whatever the node considered. Thus, all the nodes take the same time to be run, whatever the result (whether there is an intersection or not, whether the computation counter is modified), because the duration of a node is fixedly defined. Thus, the tasks or iterations are "synchronized" between each other by fixed run time; and then
- this is iterated by re-filling the computation nodes and by re-starting up their simultaneous run, until the queue is empty.

Therefore, there is no complex synchronization which requires to monitor an end of iteration or computation run. The total time can be predicted by knowing the queue size, without knowing the individual result of the computations, whereas this would be required if the synchronization were made by waiting for the run end of the computations. Thus, the invention is in opposition to the state of prior art, which prompts one to think that it would be useful to clear nodes the computations of which are trivial (no intersection) to reallocate them after the queue, in particular in the case of a MIMD machine. Thanks to the invention, this can be operated in SIMD, trivial nodes are not free, because they are forced to simultaneously run the current instruction of the current task of their SIMD group. However, the performance is better than if the nodes affected to trivial tasks were reallocated to tasks in stand-by.

Further Improvement of the Invention

Knowing the inside of the product 3D in a purely mathematical sense is rarely sufficient for a good production of the corresponding product. Very often, parameters specific to the process are such that this information should be slightly adapted. For example in a stereolithography, in reference to FIG. 4, the polymerization depth 21 of a layer 22 on another layer 23 previously deposited is higher than the thickness 24 of this layer 22 as deposited, to ensure a good adhesion between layers (this is "overpolymerization"). In reference to FIG. 4, the consequence is that the solidified region is not necessarily optimum from the point of view of meeting the dimensions of the 3D product if the information describing the layer being polymerized is solely used. It can be seen, in the example of FIG. 4 in a profile cross-section for which successive layers are horizontal, that the less vertical the walls 33 of the product, the stronger the errors 25, 26 and 27 of dimensions with respect to the theoretical contours of the product to be produced: for a vertical wall, the error 27 is null, for a wall close to the vertical, the error 25 is low, and for a wall close to the horizontal, the error 26 is strong.

The conventionally used solution is to compare cross-sections. This is a complex operation, described in patent EP 0 555 369 B1. It is all the more complex that a crucial information is lost when only cross-sections are handled: indeed, the error made typically depends on the angle of the wall to the vertical (cf. FIG. 4).

A further improvement of the invention yet enables the overpolymerization to be taken into account, substantially without increasing the computation time, while perfectly managing any angle randomly distributed on the product, and remaining easy to be implemented in SIMD.

In the particular case where for each point $D_i$ the projection F is such that $F\{F(D_i).p\}$ is a straight line, at least locally (that is in the space region comprising $D_i$ and O'), the expression $\vec{N_j}.\overrightarrow{F(I)}.n$ used in step IV.iii described above is reduced to the expression $\vec{N_j}.\overrightarrow{F(D_i)}.n$, that can be precomputed and tabulated before starting step IV. If additionally F is such that all the $\overrightarrow{F(D_i)}.n$ are identical (for example, if F is an orthographic projection), then the expression $\vec{N_j}.\overrightarrow{F(I)}.n$ now only depends on $N_j$, that is on the surface $S_j$ being processed.

The above operation IV can then be rewritten the following way, by applying it to two groups of complementary $S_j$, without resulting in a change in the run time (this is a writing reorganisation of the same computations). If N denotes the different $\overrightarrow{F(D_i)}.n$ (all identical by hypothesis), in place of step IV previously described, there are now the following steps:

IV. For any element $S_j$ belonging to O', its normal is denoted $N_j$ and O' is divided into two new complementary subsets $O^+$ and $O^-$ such:
  i. that the subset $O^+$ contains all the $S_j$ (denoted $S_j^+$) of O' the scalar product $N_j.N$ of which is positive or null, the elementary surfaces $S_j^+$ being thus surfaces for entrance into the object O', and
  ii. that the subset $O^-$ contains all the $S_j$ (denoted $S_j^-$) of O' the scalar product $N_j.N$ of which is negative, the elementary surfaces $S_j^-$ being thus surfaces for exit from the object O'.

V. For any element $S_j$ belonging to $O^+$ and for any $D_i$ belonging to D, the intersection between $F\{F(D_i).p\}$ and $S_j$ is computed (rasterization).
  i. if there is an intersection I, and if $F(I).v > F(D_i).v$, $F(D_i).c$ is incremented by 1

VI. For any element $S_j$ belonging to $O^-$ and for any $D_i$ belonging to D, the intersection between $F\{F(D_i).p\}$ and $S_j$ is computed (rasterization).
  i. if there is an intersection I, and if $F(I).v > F(D_i).v$, $F(D_i).c$ is decremented by 1.

The idea is no longer to use a single set D of points, but two of them, denoted $D^+$ and $D^-$, and to apply the processings relating to $O^+$ and $O^-$ on their respective set. By judiciously selecting $D^+$ and $D^-$, compensations specific to the process can be computed.

Let us consider for example the overpolymerization problem in stereolithography, in reference to FIG. 5. The beam impact solidifies part of the liquid, into a shape depending on the incidence angle and a depth depending on power. Set $D^+$ (referenced 28) is defined as the one of the working points which is located at the surface of the liquid of a layer, and set $D^-$ (referenced 29) as the set of points at the low end of the polymerized zones. Thus, to each point $D_i$ of $D^+$, now called $D_i^+$ (referenced 30) corresponds a point $D_i^-$ (referenced 31) of $D^-$ which is an image of $D_i^+$ by translation of $D_i^+$ downwardly along the separation direction between two stereolithography layers and along the polymerization depth 32 of a layer. From the algorithm point of view, nothing imposes that $D^+$ and $D^-$ are planar, but in the example considered, $D^+$ is in the plane of the liquid surface, and $D^-$ is a very slightly curved surface, which could even be approximated by a plane for some machines the optical device of which is suitable for it.

The algorithm is then slightly modified, which now takes the following form:

I. Optionally, a subset O' of O is determined $$O' = \bigcup_j S_j$$

such that the description of the object O' has the form of a decomposition of the object O' into several elementary surfaces $S_j$ selected from the oriented and preferably planar $S_i$:
either by keeping O'=O in this case, the set of $S_j$ corresponds to the set of $S_i$, and it is sufficient to replace $S_j$ by $S_i$ and O' by O later in the description), or optionally by performing a filter:
  i. a minimum region R of P is determined containing all the $F(D_i^+).p$
  ii. the subset O' of O is determined such that an element of O not being part of O' has no projection by F on P belonging to R. This sorting step is conventionally used in computer science to reduce the computing time by locally applying it to a smaller subset (herein, the only elements of O which can have a projection in R).

II. The set $D^-$ of image points $D_i^-$ is built from the set $D^+$ of points $D_i^+$ having a projection by F and for which it is desired to know whether they should be selected for producing the product, according to a law specific to the producing process implying the simultaneous presence in the object O' of the considered point $D_i^+$ and a derived (or image) point $D_i^-$ (typically by translation of each $D_i^+$ along the polymerization depth as previously described). $D^-$ denotes the set consisting of the derived (or image) points $D_i^-$ of each of the points $D_i^+$ of $D^+$.

III. For any element $D_i^+$ belonging to $D^+$, that is for each working point $D_i^+$ for which it is attempted to determine whether it is inside or outside the object O', it is computed or determined:
a line $F\{F(D_i^+).p\}$ passing through the working point $D_i^+$, and
$F(D_i^+).p$ the curvilinear coordinate of the working point $D_i^+$ along $F\{F(D_i^+).p\}$.

IV. At any $D_i^+$ for which it is attempted to determine whether it is inside or outside the object O', and thus at any line $F\{F(D_i^+).p\}$, is associated a counter, denoted $F(D_i^+).c$, dedicated solely to this working point $D_i^+$. The value of this counter is initialized to 0.

V. For any image point $D_i^-$ belonging to $D^-$, it is computed or determined:
a line $F\{F(D_i^-).p\}$ passing through the derived (or image) point $D_i^-$ of $D_i^+$, preferably confounded with the line $F\{F(D_i^+).p\}$, and
$F(D_i^-).v$ the curvilinear coordinate of the point $D_i^-$ along $F\{F(D_i^-).p\}$.

VI. At any $D_i^-$, and thus at any line $F\{F(D_i^-).p\}$, is associated a counter, noted $F(D_i^-).c$, dedicated solely to this derived point or image $D_i^-$. The value of this counter is initialized to 0.

VII. For any element $S_j$ belonging to O', $N_j$ designates its normal and two new subsets $O^+$ and $O^-$ are created such that $O^+$ contains the $S_j$ of O' the scalar product $N_j.N$ of which is positive or null, and $O^-$ all the others. In other words, the elementary surfaces are separated into two distinct groups, a group $O^+$ of surfaces $S_j^+$ for entrance into the object O' and a group $O^-$ of surfaces $S_j^-$ for exit from the object O', the entrance and the exit into or from the object O' being defined with respect to a direction of movement 32.

VIII. After, the following operations are iterated on each of the elementary surfaces $S_j$:
  i) for any element $S_j$ belonging to $O^+$, that is if the surface $S_j$ is an entrance surface $S_j^+$, and for any $D_i^+$ belonging to $D^+$,
    the intersection between this elementary surface $S_j^+$ and the line $F\{F(D_i^+).p\}$ passing through the working point $D_i^+$ is searched for and computed. Further, if this intersection I exists, and if $F(I).v > F(D_i^+).v$, the counter $F(D_i^+).c$ is modified according to a modification of passage through the surface (typically, $F(D_i^+).c$ is incremented by one unity)
  ii) for any element $S_j$ belonging to $O^-$, that is if the surface $S_j$ is an exit surface $S_j^-$, and for any $D_i^-$ belonging to $D^-$, the intersection between this elementary surface $S_j^-$ and the line $F\{F(D_i^-).p\}$ passing through the image point $D_i^-$ is searched for and computed. Further, if this intersection I exists, and if $F(I).v > F(D_i^-).v$, the counter $F(D_i^-).c$ is modified according to the modification of passage through the surface (typically, $F(D_i^-).c$ is incremented by 1).

IX. For each working point $D_i^+$, it is determined whether this working point $D_i^+$ is inside or outside the object O' as a function of the counter dedicated to the working point $D_i^+$ and the counter dedicated to the image $D_i^-$ of the working point. More exactly, for each working point $D_i^+$, it is determined whether this working point $D_i^+$ is inside or outside the object O' by comparing the counter dedicated to the working point $D_i^+$ and the counter dedicated to the image $D_i^-$ of the working point. The following are selected:
the $D_i^+$ meeting the condition "$F(D_i^+).c > F(D_i^-).c$" as being working points located inside the object O',
the other points $D_i^+$ (for which $F(D_i^+).c \leq (D_i^-).c$) as being working points located outside the object O'.

Figure 6:
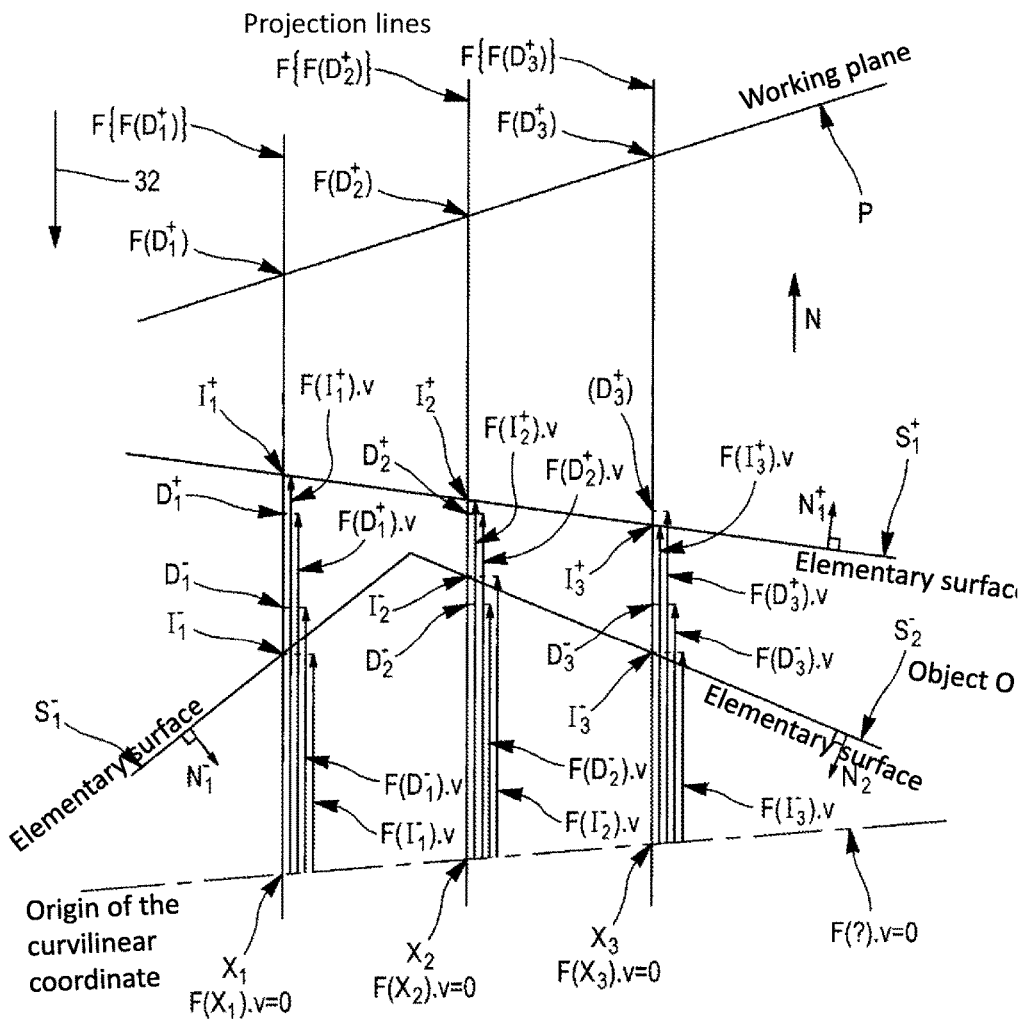
FIG. 6 illustrates the second exemplary implementation of the process according to the invention.

Detailed Example (FIG. 6)

In reference to FIG. 6, a cross-section view shows how to take advantage of this improved process according to the invention to polymerize a point $D_i^+$ only if $D_i^+$ and its corresponding $D_i^-$ are both in the material. The process according to the invention comprises in this example the following steps:
1. Initializing all the $F(D_i^+).c$ to 0.
2. Computing all the $F(D_i^+).v$ 3. Initializing all the $F(D_i^-).c$ to 0.
4. Computing all the $F(D_i^-).v$
5. Processing $S_1^+$
   a. Processing $D_1^+$.
      i. $F(I_1^+).v > F(D_1^+).v$, thus $F(D_1^+).c$ is increased by 1
   b. Processing $D_2^+$.
      i. $F(I_2^+).v > F(D_2^+).v$, thus $F(D_2^+).c$ is increased by 1
   c. Processing $D_3^+$.
      i. $F(I_3^+).v < F(D_3^+).v$, thus $F(D_3^+).c$ is unchanged
6. Processing $S_1^-$
   a. Processing $D_1^-$.
      i. $F(I_1^-).v < F(D_1^-).v$, thus $F(D_1^-).c$ is unchanged
   b. Processing $D_2^-$.
      i. No intersection between $S_1^-$ and $F\{F(D_2^-).p\}$
   c. Processing $D_3^-$.
      i. No intersection between $S_1^-$ and $F\{F(D_3^-).p\}$
7. Processing $S_2^-$
   a. Processing $D_1^-$.
      i. No intersection between $S_2^-$ and $F\{F(D_1^-).p\}$
   b. Processing $D_2^-$.
      i. $F(I_2^-).v > F(D_2^-).v$, thus $F(D_2^-).c$ is increased by 1
   c. Processing $D_3^-$.
      i. $F(I_3^-).v < F(D_3^-).v$, thus $F(D_3^-).c$ is unchanged At the end of the run, there are:
  $(F(D_1^+).c=0+1=1) > (F(D_1^-).c=0)$, thus $D_1$ is selected as being located inside the object O.
  $(F(D_2^+).c=0+1=1) = (F(D_2^-).c=0+1=1)$, thus $D_2$ is not selected as being located inside the object O.
  $(F(D_3^+).c=0) = (F(D_3^-).c=0)$, thus $D_3$ is not selected as being located inside the object O.

Figure 7:
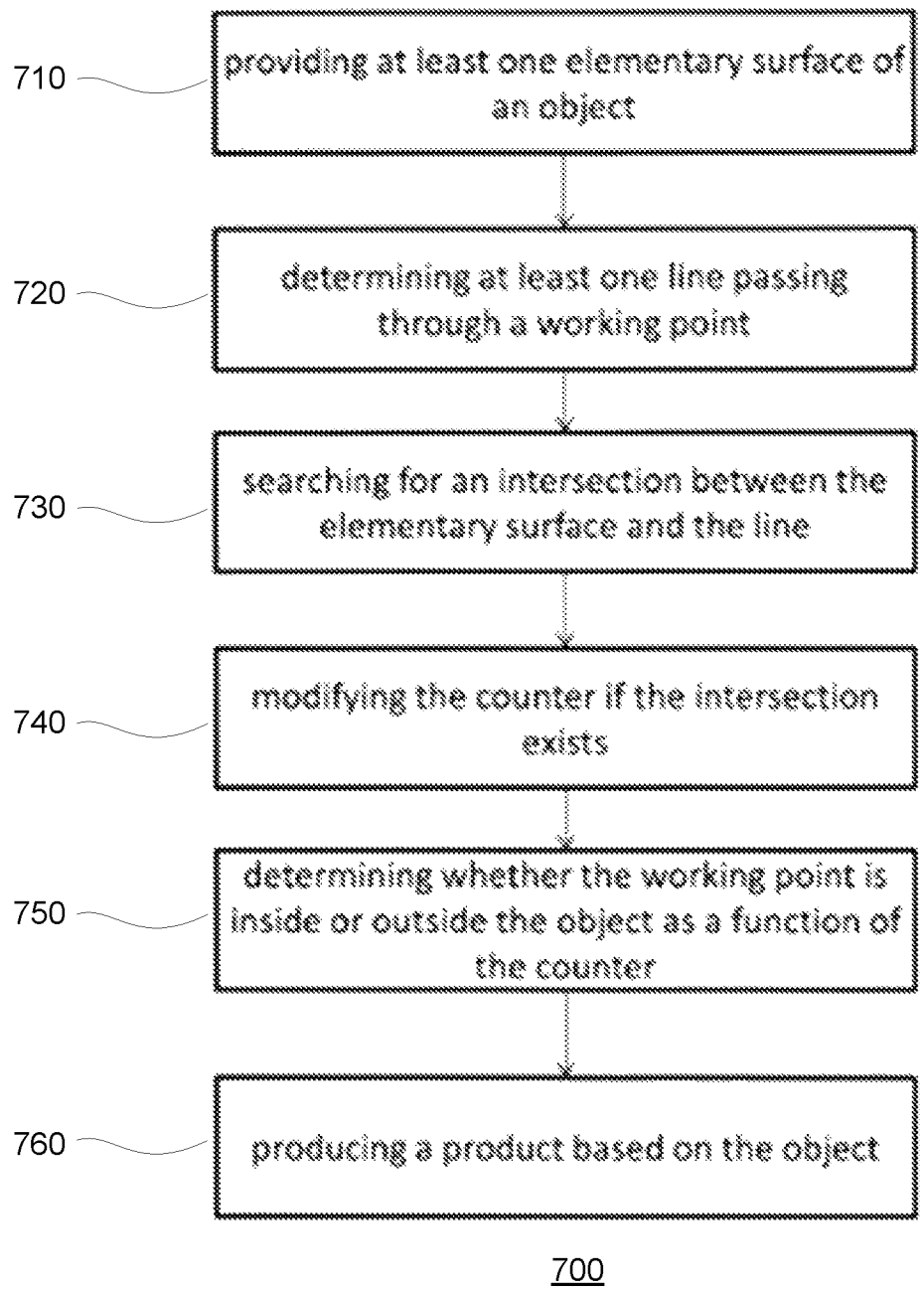
FIG. 7 is a flow diagram of a process according to the invention.

In reference to FIG. 7, a flow diagram shows an example process 700 for determining whether a working point within a finite space are inside or outside of an object (or a slice or layer of an object) corresponding to a product being produced. At 710, at least one elementary surface of the object is provided. At 720, at least one passing line through the working point is determined. At 730, a search is conducted to determine whether there is any intersection between the elementary surface and the passing line. If such an intersection is found, then at 740, a counter is modified. Modifying the counter may involve increasing or decreasing the counter by unity. Also, the counter may be dedicated solely to the specific working point under analysis, such that the dedicated counter is only modified for determinations in connection with the specific working point, and not with any other working points that may also be under analysis. The steps of 720-740 may be conducted for multiple surfaces. At 750, the working point is determined to be inside or outside the object as a function of the counter. Finally, at 760, the object is used to produce a product, wherein knowledge of the working point being inside or outside the object is utilized in producing the product.

Of course, the invention is not limited to the examples just described and numerous alterations can be made to these examples without departing from the scope of the invention.

The invention claimed is:

1. A process for producing a product, comprising: determining whether working points of a finite space are inside or outside an object decomposed into elementary surfaces, said object corresponding to the product to be produced or to a part or layer or slice of the product to be produced, the process comprising:
choosing a working point within the finite space;
associating a counter related solely to the working point, said counter being distinct from counters related to other working points;
for the chosen working point, determining at least one line among a line passing through this working point with which is associated the counter dedicated solely to this working point, and a line passing through an image of the working point with which is associated the counter dedicated solely to this image of the working point; and
iterating, on each of the elementary surfaces, the following operations:
  searching for an intersection between the elementary surface and one of the lines from the line passing through the working point and the line passing through the image of the working point; and
  modifying the counter if the intersection exists; and
determining whether the working point is inside or outside the object as a function of the counter dedicated solely to the working point;
each of the preceding steps being implemented by at least a computer, a central processing or computing unit, an analogue electronic circuit, a digital electronic circuit, or a microprocessor;
wherein the process comprises producing the product corresponding to the object once said working point has been determined to be located inside or outside the object,
wherein a plurality of working points are chosen, and for each of the chosen working points, the determinations of whether the working points are inside or outside the object are made simultaneously and independently of one another; and
wherein, for at least one elementary surface, the iterated operations are performed in parallel over time for a plurality of working points by distributing the operations over a plurality of computation nodes, such that each of the operations is performed by one of the computation nodes.

2. The process according to claim 1, wherein:
determining at least one line comprises determining a line passing through the working point with which is associated a counter dedicated solely to this working point,
iterating comprises iterating, on each of the elementary surfaces, the following operations:
searching for an intersection between the elementary surface and the line passing through the working point,
modifying the counter if the intersection exists, and
determining whether the working point is inside or outside the object comprises determining whether the working point is inside or outside the object as a function of the value of the counter dedicated solely to the working point.

3. The process according to claim 2, wherein the line passes through an origin, and modifying the counter comprises:
if the intersection is located beyond the working point with respect to the origin of the line, no modification of the counter, and
if the intersection is not located beyond the working point with respect to the origin of the line, modifying the counter differently depending on whether the intersection of the line corresponds to an entrance of the line into the object or an exit of the line from the object with respect to the origin.

4. The process according to claim 1, wherein:
determining at least one line comprises determining a line passing through the working point with which is associated a counter dedicated solely to this working point and a line passing through an image of the working point with which is associated a counter dedicated solely to this image of the working point, the process further comprises separating the elementary surfaces into two distinct groups, a group of surfaces for entrance into the object and a group of surfaces for exit from the object with respect to a direction of movement, the iteration comprises an iteration, on each of the elementary surfaces, of the following operations:

if the surface is an entrance surface, searching for an intersection between this elementary surface and the line passing through the working point and modifying the counter associated with the working point if the intersection exists, if the surface is an exit surface, searching for an intersection between this elementary surface and the line passing through the image of the working point, and modifying a counter associated with the image of the working point if the intersection exists, determining whether the working point is inside or outside the object comprises determining whether the working point is inside or outside the object as a function of the counter dedicated to the working point and the counter dedicated to the image of the working point.

5. The process according to claim 4, wherein determining whether the working point is inside or outside the object as a function of the counter dedicated to the working point and the counter dedicated to the image of the working point comprises comparing the counter dedicated to the working point and the counter dedicated to the image of the working point.

6. The process according to claim 4, wherein for all the working points and images of the working points, the lines passing through these points are parallel.

7. The process according to claim 1, wherein for all the working points and images of the working points, the lines passing through these points are not parallel.

8. The process according to claim 1, wherein for all the working points and images of the working points, the lines passing through these points do not intersect inside the finite space.

9. The process according to claim 1, wherein the space is a three dimension space.

10. The process according to claim 9, wherein the working points are gathered in a working surface, and in that each line passing through a working point and each line passing through an image of a working point is transverse to this working surface through this working point.

11. The process according to claim 10, wherein the working surface corresponds to a layer or at least a part of a layer to be deposited to produce the product by rapid prototyping.

12. The process according to claim 1, wherein the space is a two dimension space.

13. The process according to claim 1, wherein the iteration step is performed in parallel over time for a plurality of elementary surfaces.

14. The process according to claim 13, wherein the iteration steps performed in parallel are synchronized by a fixed run time.

15. A device for producing a product based on whether working points of a finite space are inside or outside an object decomposed into elementary surfaces, said object corresponding to the product to be produced or to a part or layer or slice of the product to be produced, the device comprising:

one or more processors configured to:
choose a working point from within the finite space;
associate a counter related solely to the working point, said counter being distinct from counters related with other working points;
determine, for the chosen working point, at least one line among a line passing through this working point with which is associated a counter dedicated solely to this working point, and a line passing through an image of the working point with which is associated a counter dedicated solely to this image of the working point;
iterate, on each of the elementary surfaces, the following operations:
searching for an intersection between the elementary surface and a single one of the lines from the line passing through the working point and the line passing through the image of the working point; and
modifying the counter if the intersection exists; and
determine whether the working point is inside or outside the object as a function of the counter dedicated solely to the working point;
each of the one or more processors being a computer, a central processing or computing unit, an analogue electronic circuit, a digital electronic circuit, or a microprocessor;
the device being configured to produce the product once said working point has been determined to be located inside or outside the object by superimposing a plurality of successive lithography layers; and
the one or more processors being configured to choose a plurality of working points, and for each of the chosen working points, the determinations of whether the working points are inside or outside the object are made simultaneously and independently of one another; and
wherein, for at least one elementary surface, the iterated operations are performed in parallel over time for a plurality of working points by distributing the operations over a plurality of computation nodes, such that each of the operations is performed by one of the computation nodes.

16. The process according to claim 1, wherein the searching and modifying steps are performed independently of one another and in parallel for each of a plurality of chosen working points.

* * * * *